April 30, 1929.  N. B. GARDINER  1,710,771
LIQUID HANDLING APPARATUS
Filed Dec. 15, 1925  7 Sheets-Sheet 1
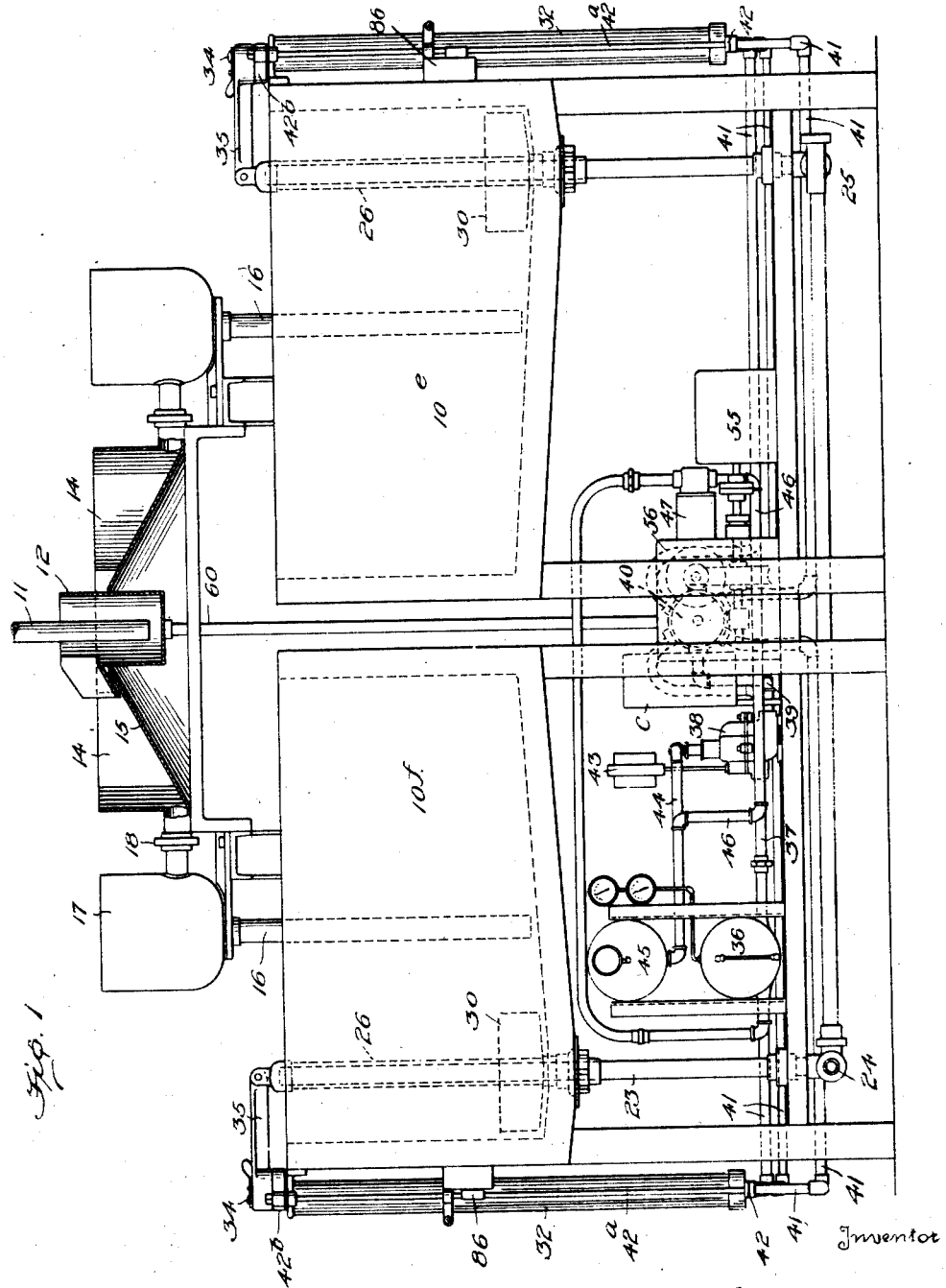

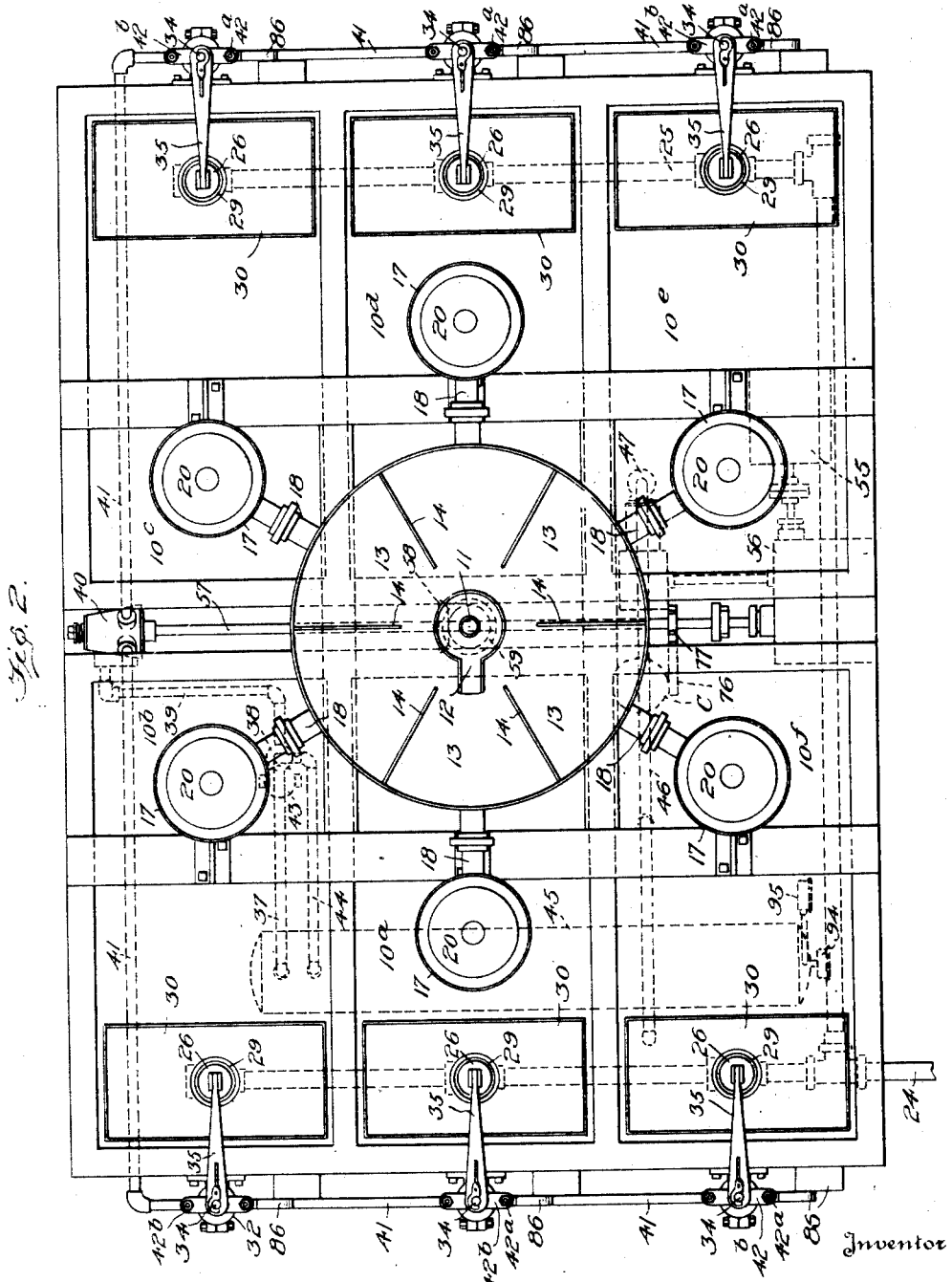

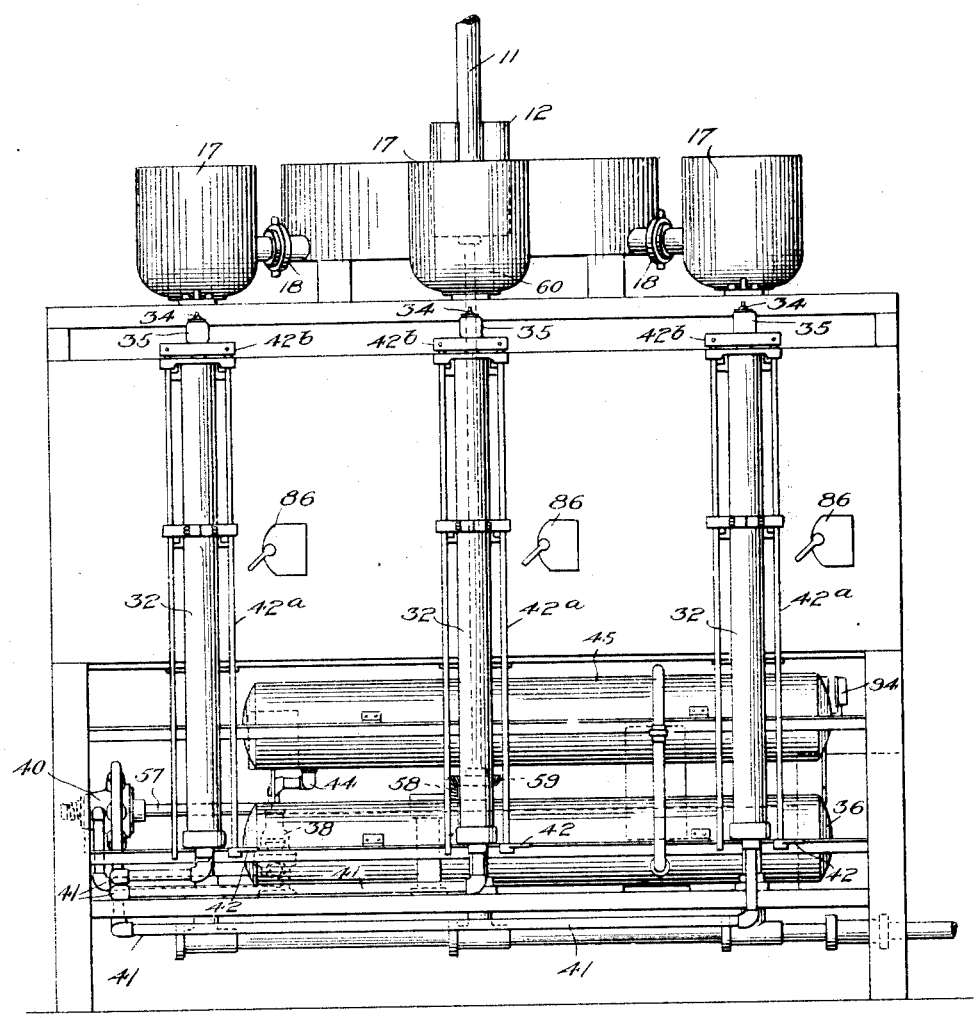

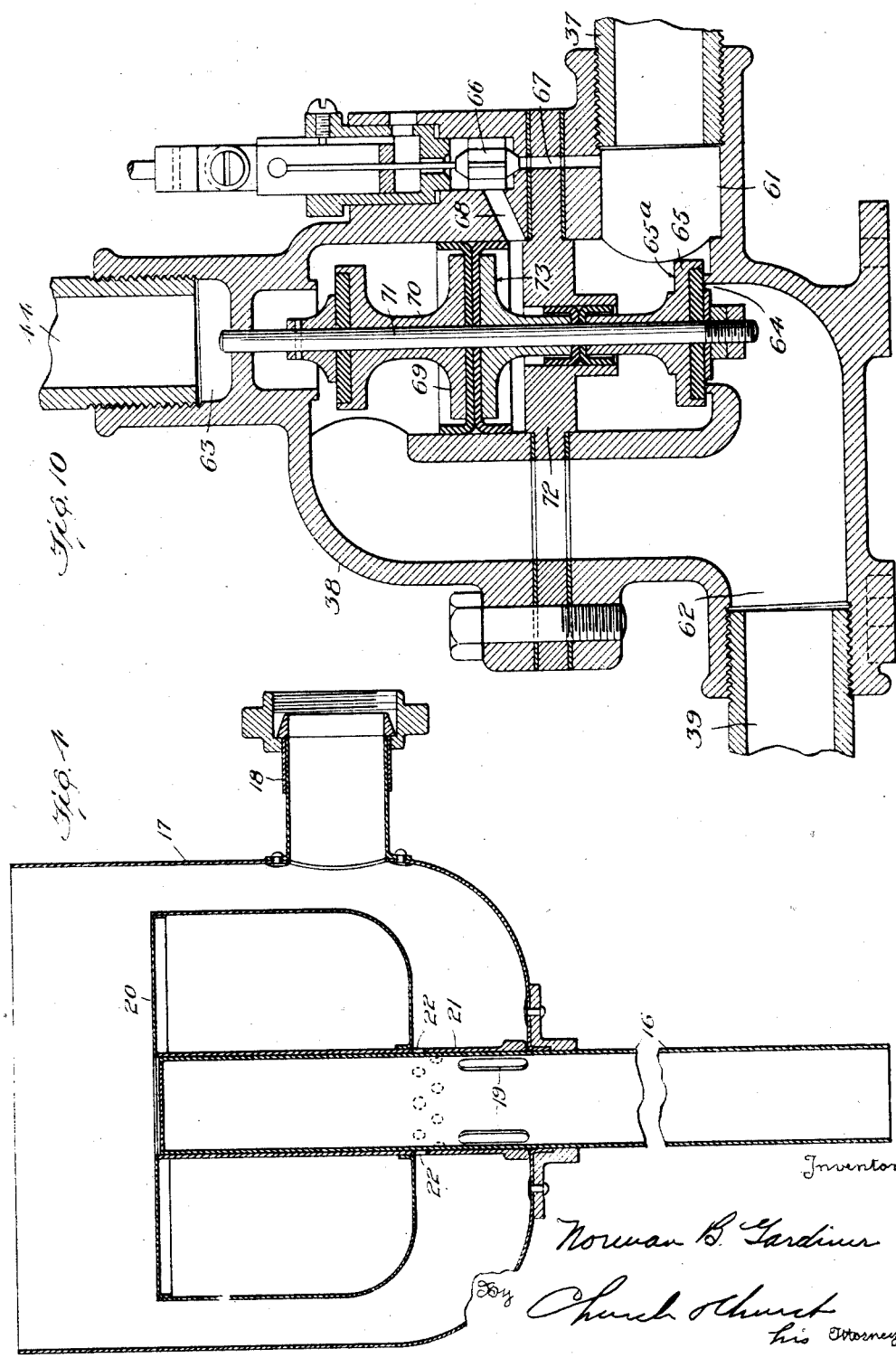

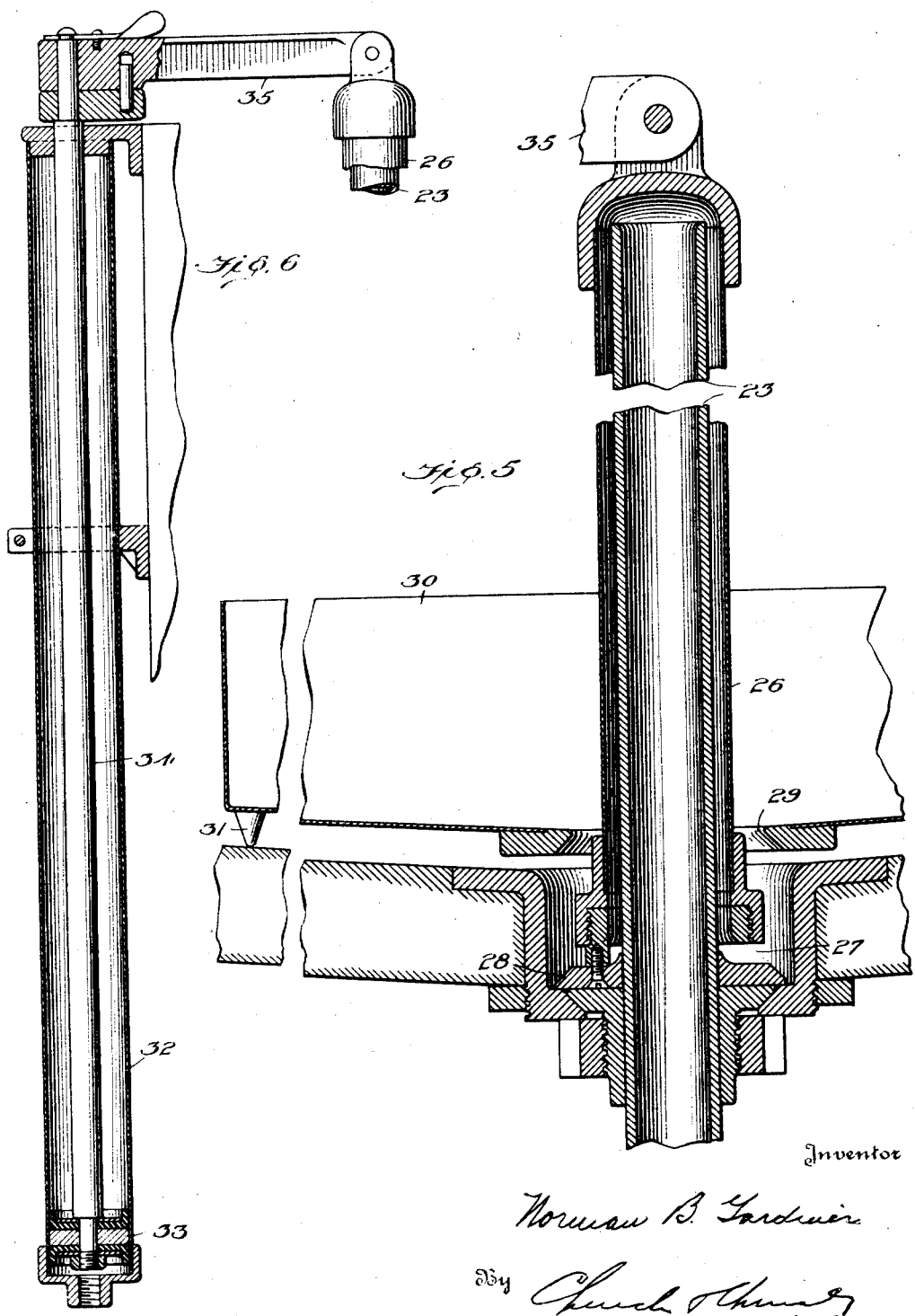

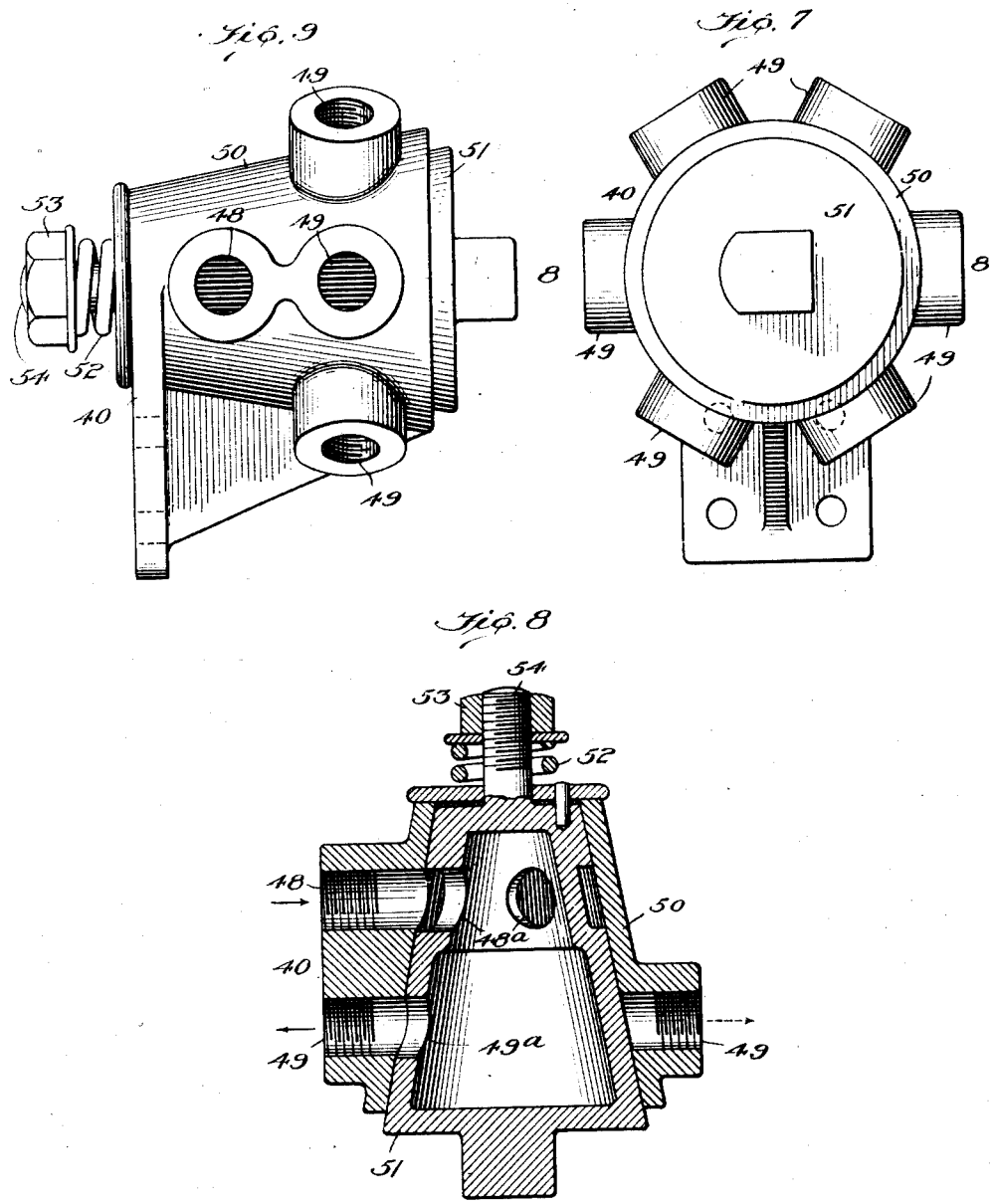

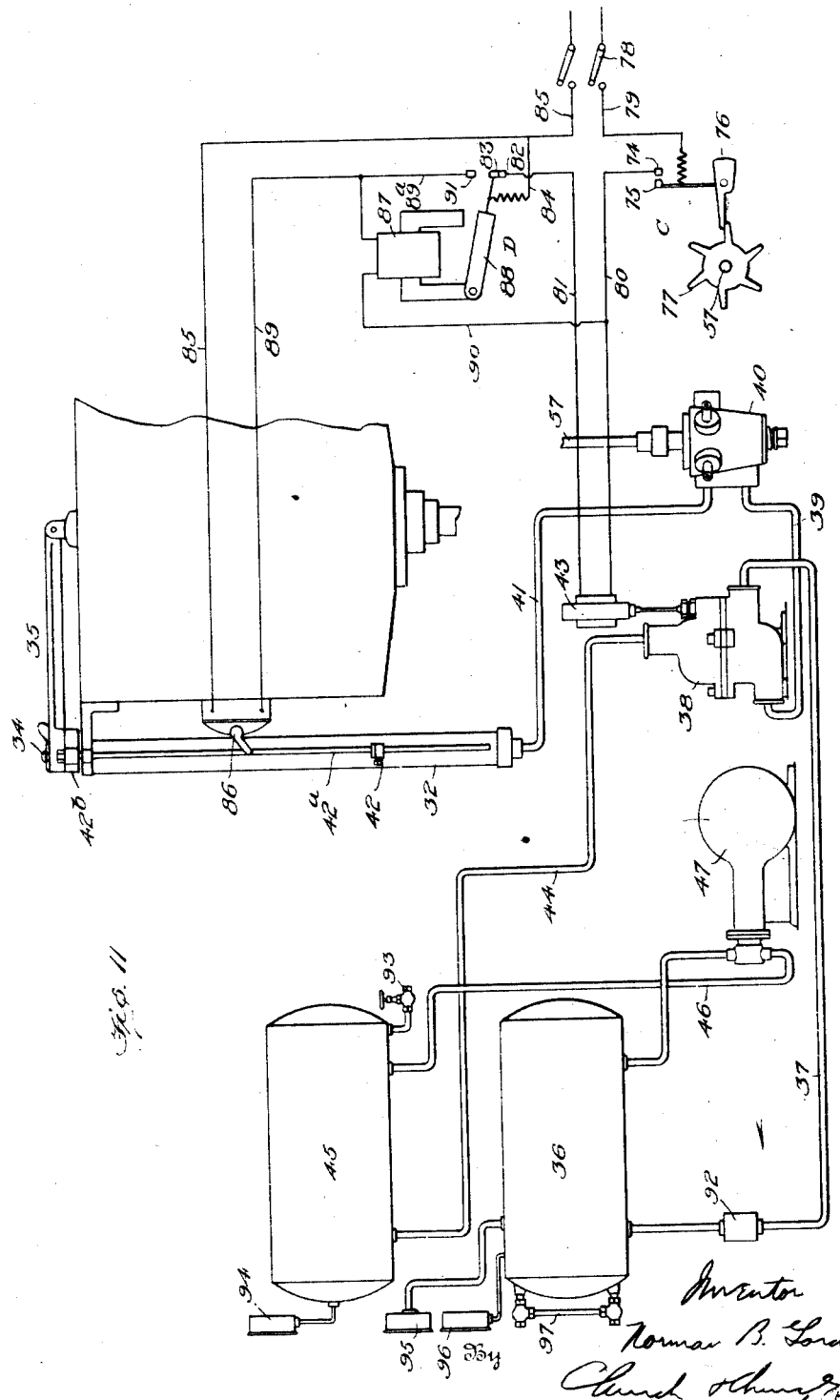

Patented Apr. 30, 1929.

1,710,771

UNITED STATES PATENT OFFICE.

NORMAN BENTLEY GARDINER, OF BALTIMORE, MARYLAND.

LIQUID-HANDLING APPARATUS.

Application filed December 15, 1925. Serial No. 75,574.

This invention relates generally to improvements in liquid handling apparatus and more especially to an apparatus designed for handling milk during the pasteurization thereof.

In the pasteurization of milk as practiced at the present time the milk is heated to the desired temperature and then held in properly insulated tanks or vats at that temperature for a given length of time, after which it is discharged and cooled. If this process is properly carried out all pathogenic bacteria and a great many other bacteria found in milk are destroyed. However, in most of the tanks or vats found in use at the present time it seems to be impossible to get perfect pasteurization of the milk and it is believed that this imperfect treatment is due particularly to two faults which are, first, leaking valves, and, second, valves which extend beyond the limits of the tank or vat and beyond the insulating covering so that the milk contained therein is not maintained at the proper temperature for the proper period of time. More specifically, leaking valves prevent perfect pasteurization of the milk, because while one batch of milk is being held in the tank to subject it to the desired heat for the desired length of time, raw milk accidentally finds its way through the valve into the tank after the batch has been placed in the tank so that such accidentally admitted milk is not subjected to the proper temperature for the proper period of time with the result that it is not pasteurized but, on the contrary, contaminates the particular batch which is being held in the tank. This takes place where the valve controlling the supply of milk to the holding vat is faulty. Again, where the valve controlling the discharge of the milk from the tank, after pasteurization, is faulty, some of the milk admitted to the tank finds its way through such faulty valve before becoming perfectly pasteurized. Milk of this nature escaping through the discharge valve naturally finds its way through the discharge conduits to previously treated batches of milk and, having escaped before being perfectly pasteurized, effects a contamination of the previously treated batch.

With these defects in mind the primary object contemplated by the present invention is the provision of liquid handling apparatus and particularly apparatus for pasteurizing milk wherein the body of liquid or milk being held in the holding tank cannot be contaminated or otherwise affected by particles of liquid accidentally finding their way into the tank and into the body of liquid undergoing treatment within said tank.

The invention also seeks to provide a milk treating apparatus wherein the milk may be supplied to the holding tank with little or no likelihood of air becoming incorporated in the milk as it flows into the holding tank. This not only prevents foaming of the milk as it flows into the tank but also prevents incorporation of oxygen in the milk which would have a tendency to cause oxidation and deterioration of the milk itself.

A further object of the invention is the provision of a novel arrangement for discharging the milk or liquid after treatment from the holding tank in suchwise that it is absolutely impossible for milk or liquid held within the tank to accidentally escape from the tank and become admixed with milk or liquid previously treatel and withdrawn from the tank.

With these and other objects in view the invention consists in certain novel details of construction and combinations and arrangements of parts all as will hereinafter be more described and the novel features thereof particularly pointed out in the appended claims.

In the accompanying drawings,—

Figure 1 is a side elevation of an apparatus embodying the present improvements.

Fig. 2 is a top plan view of the apparatus shown in Fig. 1, some of the parts within the apparatus being indicated in dotted lines.

Fig. 3 is an end elevation of the apparatus shown in Fig. 1.

Fig. 4 is a detail sectional view of the non-foaming attachment which may be used in the apparatus of Figs. 1—3.

Fig. 5 is a detail sectional view illustrating the arrangement for establishing the siphonic discharge of the contents of one of the holding tanks, it being understood that each of the tanks is provided with one of these devices.

Fig. 6 is a detail view of the lifting mechanism for actuating that part of the apparatus shown in Fig. 5.

Fig. 7 is a top plan view of the distributing valve for successively placing the lifts of the respective discharge devices in communication with a suitable source of fluid pressure and with a vacuum tank to which such fluid or other medium is returned from the lifts.

Fig. 8 is a sectional view on line 8—8 of Fig. 7.

Fig. 9 is an elevational view of the distributing valve shown in Figs. 7 and 8.

Fig. 10 is a sectional view of a hydraulic valve through which the fluid pressure medium flows from the source of supply to the lifts of the discharging devices and from said lifts to the vacuum tank from whence it is returned to the original source of supply.

Fig. 11 is a diagrammatic illustration of the apparatus to facilitate the description of a complete cycle of operation of the device.

While the invention in the present case is susceptible of use in connection with the handling of various liquids it is particularly designed for the pasteurization of milk and in order that the operation may be continuous there is provided a series of holding tanks, preferably six, into which the milk is adapted to be delivered successively, held therein, and then discharged from such tanks in the order in which they were filled. For instance as illustrated in Figs. 2 and 7 milk supplied through the pipe 11 is distributed to the tanks by a distributor head 12, said head being shown as in position to supply the milk to tank 10ª. Preferably, the tanks are so arranged that the distributor head need not be reciprocated back and forth to communicate with the same but need simply be revolved, the spout of the distributor head being adapted to be successively moved into communication with a series of troughs 13 formed by partitions 14 on a conically shaped platform 15, each of these troughs 13 communicating with one of said holding tanks. From the foregoing it will be seen that as the distributor head passes from the trough 13 communicating with the holding tank 10ª the milk which continuously flows from said head will flow down the next trough 13 into the holding tank 10ᵇ and after it passes the next partition the milk will be emptied into the next trough 10ᶜ and so on around the platform 15 until said distributor head has returned to the position to supply milk to the tank 10ª. The rotation of the distributor head, however, is so timed that the milk first deposited in the tank 10ª will have been held in that tank the desired length of time to pasteurize it and will have been discharged from said tank so that the tank is empty when the distributor head again reaches the position to deliver milk thereto. In other words, each tank in succession is filled with a body of milk that is held therein a certain length of time, and is then emptied before the distributor head has made a complete revolution to again fill it. In this connection it will be observed that after distributor head 12 passes the trough of one tank it is utterly impossible for any additional milk to find its way into that particular tank to contaminate the batch deposited therein.

As the filling devices and the discharge mechanisms of each of the tanks are identical it is believed necessary only to describe one of each of them, although a complete cycle of operation of the entire apparatus will be later described.

Milk discharged into the trough 13 is adapted to be delivered into tank 10ª by means of an inlet pipe 16 extending substantially to the bottom of the tank and while the milk may flow into the tank without any obstructions it is preferred that means be provided for flowing the milk into the tank without air becoming incorporated therein so as to avoid foaming. Such means for preventing the formation of foam are not really essential and may be dispensed with but in many instances the use of the same is desirable. One arrangement for preventing the foaming of milk consists in projecting the supply pipe 16 having a closed upper end up into a vessel 17 above the tank 10 into which vessel milk is delivered from trough 13 by means of a connection 18. At the bottom of said vessel 17 the inlet pipe 16 is provided with a series of ports 19, the opening and closing of which is controlled by a float valve that may consist of a float 20 slidable within the vessel 17 on the upper end portion of the inlet pipe, said float having a depending sleeve-like portion 21 surrounding the pipe 16 which substantially closes the ports 19 when the float is depressed but which will be raised to uncover said ports when a sufficient quantity of milk has entered vessel 17 to elevate float 20. To prevent air being sucked in through ports 19 by milk flowing through said ports, float 20 is so arranged with respect to the ports that it will not be elevated to substantially uncover ports 19 until milk delivered into vessel 17 reaches a height within the vessel above the upper ends of ports 19 so that at the moment the float is initially elevated to uncover the major portion of the ports and even when the float is completely elevated to fully uncover the ports, said ports will be entirely submerged in or covered by the body of milk within the vessel. Therefore, it will be impossible for air to enter pipe 16 through the ports. In addition the leakage of air between the upper end of sleeve valve 21 and the pipe 16 is prevented by the provision of a series of orifices 22 in the upper end of said valve which permit a small quantity of milk to flow between said sleeve and pipe, thereby forming a liquid seal which will prevent air reaching the ports 19. In this way no air can possibly be sucked down through inlet pipe 16 by the milk flowing through said pipe and consequently no air bubbles or foam will be formed on the body of liquid deposited in said tank.

After the milk has been held in the tank the proper length of time to thoroughly pasteurize it, it must be discharged from said tank in order that a second batch may be placed in the tank and in accordance with one of the objects contemplated by this invention, this discharge of the milk from the tank is accomplished by a discharge device that will absolutely prevent any milk leaking out of the tank and reaching a previously pasteurized batch so as to contaminate the same. In the preferred arrangement this discharge apparatus consists of a discharge pipe 23 which extends upwardly through the tank to a point above the highest point to which the tank is adapted to be filled. As illustrated, the discharge pipes of tanks 10$^a$, 10$^b$ and 10$^c$ communicate with a pipe line 24 which leads to suitable cooling apparatus and the discharge pipes of 10$^c$, 10$^d$ and 10$^e$ communicate with a pipe 25 which is in turn connected by a suitable union to said pipe line 24.

As the discharge pipe extends above the liquid level in the tank it will be obvious that liquid within the tank cannot possibly escape by accident through said pipe but for obtaining a discharge of the liquid from the tank, when desired, there is slidably arranged on said pipe a sleeve 26 having a port 27 in its lower end and also provided at its lower end below said port with a laterally extending portion 28 which is adapted to engage the walls of a central bore 29 in the bottom of a vessel or pan 30 surrounding said pipe 23 and sleeve 26. Normally, this sleeve and pan occupy a position at the bottom of the tank with the port 27 in the sleeve spaced somewhat below the central bore in said pan and with said pan spaced slightly from the bottom of the tank by supporting legs 31 engaging said tank bottom so that as the milk flows into the tank the pan will be filled and the space between the sleeve and discharge pipe will be filled with a film of milk up to the level of the milk in the tank proper. When it is desired to discharge the milk from the tank said sleeve is raised until its lateral projecting portion 28 closes the central bore 29 of the pan after which both the sleeve and pan with its bottom closed, but with the interior of the pan communicating with the space between the sleeve and pipe through port 27. This elevation of the pan and sleeve is continued until the milk in the pan has reached the height where it will flow through port 27 and over the upper end of pipe 23 after which said sleeve and pan are immediately permitted to descend until the pan reaches the surface of the liquid within the tank. By thus starting the flow of milk downwardly through the discharge pipe 23 the entire body of milk will be siphoned out of the tank due to the difference between the depth of the milk in the tank and in the discharge pipe 23, the milk in the tank or space between the sleeve and pipe constituting the short leg of the siphon and the discharge pipe, which has been substantially filled by the milk in the pan, constituting the longer leg.

Various arrangements for thus elevating sleeve 26 and pan 30 and for allowing those parts to gradually recede may be used in connection with the construction described, but in the preferred arrangement these movements of said parts are preferably obtained by use of a hydraulic lift one of which is disposed at the exterior of each holding tank. As illustrated in more or less detail in Fig. 6, this automatic lift may consist of a cylinder 32 having a piston 33 therein with the piston rod 34 projecting through the upper closed end of the cylinder 32, the protruding end having mounted thereon an arm 35 overhanging the tank and which is connected at its free end in any suitable manner with the upper end of sleeve 26.

As illustrated more or less diagrammatically in Figs. 1 to 3 and 11, any suitable medium, under pressure, may be supplied from a pressure tank 36 through pipe 37 to a hydraulic valve 38 and from thence through pipe 39 to a distributing valve 40 from which such fluid pressure medium can flow through a suitable pipe, indicated at 41, in Fig. 11, to the cylinder 32 of the lift. Upon the admission of the fluid pressure medium to said lift the piston will be raised, thereby elevating the pan 30 as before described and after the pan has been elevated the proper distance, a trip 42, secured on a rod 42$^a$ mounted on a cross bar 42$^b$ on the piston 34, (Figs. 1 and 6) engages a make and break device of an electrical circuit for the purpose of affecting a circuit through a solenoid 43 which controls the action of the hydraulic valve 38, the result of which is that the action of said hydraulic valve is reversed so as to permit the fluid pressure medium in the lift 32 to return to pipe 41, valve 40, pipe 39, to said hydraulic valve from which valve the fluid pressure medium will be returned to a pipe 44 to a vacuum tank 45 which is connected by a pipe 46 to the suction end of pump 47 that maintains the pressure in pressure tank 36. Upon this release of the fluid pressure medium from the lift 42 the piston in said lift together with the pan 30 is free to gradually descend as and for the purposes hereinbefore described.

As before mentioned there is a lift 32 for each holding tank 10ᵃ–10ᶠ and for this reason the distributing valve 40 is provided with a single inlet 48 and a series of outlets 49, there being six such outlets in the present instance to correspond with the six tanks and lifts illustrated in Fig. 1. Referring particularly to Figs. 7 to 9 this distributing valve 40 is shown in more detail, said valve comprising an outer stationary casing 40 in which is located the inlet port 48 adapted to successively register with a series of ports 48ᵃ in the inner rotatable portion 51 of the valve and in which outer section 50 there is also formed the six outlet openings 49 with which a single port 49ᵃ in said member 51 is adapted to successively register. The member 51 which is of frusto-conical shape is held tight to its seat by means of a spring 52 interposed between the stationary outer member 50 and a nut 53 on the end of a stem 54 formed on said inner member 51 and projecting through member 50. Power for revolving the inner valve member 51, as well as other parts of the apparatus as will hereinafter be described, is derived from the motor 55 coupled to suitable reduction gearing 56 for driving a shaft 57 which is coupled to the inner member 51 of said valve. As will appear from Figs. 1–3, shaft 57 also carries a gear 58 meshing with a gear 59 on a shaft 60 which projects upwardly through the apparatus centrally of the group of tanks and has mounted at its upper end the distributor head 12 which is adapted to be revolved for supplying milk to the several troughs 13 as before described.

Referring to Fig. 10 the hydraulic valve 38 has the inlet opening 61 for the supply pipe 37 from pressure tank 36 and outlet 62 for the pipe 39 leading to inlet 48 of distributor valve 40 and an outlet 63 for pipe 44 leading to the vacuum tank 45. Inlet opening 61 of valve 38 can be placed in communication with outlet 62 by means of a port 64 for supplying fluid pressure medium from the tank to the lifts 32, the passage of the medium through port 64 being controlled by a valve 65 which in turn is controlled by the solenoid 43 which actuates a pilot valve 66 governing the flow of fluid through the by-passes 67–68. In Fig. 10 the parts are shown in the position which they occupy when the solenoid 43 is deenergized, pilot valve 66 being seated to close by-pass 67. Under these conditions the valve 65 is closed because the pressure on a comparatively large area 69 of the valve 70 for opening 63 is in excess of the pressure being exerted upon the more limited area 65ᵃ of valve 65, both of valves 65 and 70 being mounted on the common valve stem 75. With the valve 65 closed and valve 70 opened the fluid pressure medium in the lift 32, which at that time is in communication with the hydraulic valve through the distributor valve 40, will flow from said lift back through said valve 40 and pipe 39 into the hydraulic valve and thence through the outlet 63 of said hydraulic valve through pipe 44 to the vacuum tank 45. At the proper moment when the lift of the tank to be next emptied is to be actuated, solenoid 43 will be energized in a manner hereinafter described so as to unseat pilot valve 66 under which circumstances the fluid pressure medium will flow through by-passes 67, 68 into the small chamber formed by the partition member 72 in the hydraulic valve and the inner face of the washer 73 carried on valve stem 71 and as the previous lift has been emptied and there is no pressure on surface 69 valve 65 will be unseated because the pressure on the face of washer 73 exceeds the pressure exerted on the face 65ᵃ of valve 65. This unseating movement of valve 65, will, of course, close valve 70 so that the fluid pressure medium will flow out of outlet 62 through pipe 39 to distributor valve 40, which has been actuated one step, to supply the fluid pressure medium to lift 32 of the next tank to be emptied. After the pan of this next tank has been elevated the solenoid 43 will again be de-energized and the pilot valve 66 permitted to return to its seat with the result that the action of the hydraulic valve will again be reversed for the purposes just set forth.

For energizing and de-energizing the solenoid 43 there is a circuit containing two make and break devices one of which is indicated generally by the reference letter C and the other by the letter D in Fig. 11. No particular form of make and break device is necessary and for this reason in the present instance the make and break device C is shown as being composed of a fixed contact 74 and a movable contact 75 which is adapted to be oscillated or rocked by means of a lever 76 which in turn is rocked on its pivot by the fingers of a rotatable wheel 77 which is adapted to be rotated by the shaft 57 on which it is mounted, said wheel having a number of fingers corresponding to the number of lifts 32. When the apparatus is in operation the line switch 78 is closed and upon one of the fingers of the wheel 77 engaging the underside of lever 76 said lever will be rocked to move contact 75 into engagement with contact 74, whereupon a circuit will be established through wire 79, through contact 75–74, through line 80 to solenoid 43, from solenoid 43 through line 81 to the fixed contact 82 of the make and break device D and from the movable contact 83 of said make and break device which at that time will be in engagement with contact 82 through wires 84–85 back to the source of supply of electric energy. It will be understood that the operation of the make and break device or timer C is so regulated that the circuit just described will be established at the moment the pan 30, in say tank 10ᵃ, is to be elevated to initiate discharge of the milk from the tank and that at the time solenoid 43 is thus energized to elevate the pilot valve of the hydraulic valve 38, the distributor valve 40 will have been moved by shaft 57 to a position to permit the fluid pressure medium to be supplied to the lift 32 of said tank 10ᵃ. When the lift 32 of the tank has elevated the pan to a point where the contents of said pan will be discharged into the discharge pipe 16 of the holding tank the trip 42 carried by said lift 32 will actuate a switch 86 to close a circuit through a magnetic relay 87 whose armature 88 carries the movable contact 83 of the make and break device D. This circuit for energizing the magnetic relay 87 is composed of wire 85 running from the line switch 78 to the snap switch 86 and by wire 89 running from said snap switch back to one post of the coil of the magnetic relay and from the other post of said coil is a wire 90 which is connected to wire 80 of the circuit first described so that the circuit for said magnetic relay is completed by the contact 74—75 of the make and break device C which contacts are still maintained in engagement and wire 79 which leads back to the line switch 78. When movable contact 83 of the make and break device D is moved by the attraction of armature 88 of the magnetic relay it is brought into engagement with a fixed contact 91 on branch line 89ᵃ of wire 89 so that not only is the circuit through the solenoid F broken so as to permit of the return pilot valve 66 of the hydraulic valve 38 to its closed position and thus reverse the action of the valve as before described, but, by the engagement of contacts 83—91 a shunt circuit is maintained through the magnetic relay so as to retain contact 83 out of engagement with contact 82 to prevent solenoid 43 being again energized until the fluid pressure medium has returned from lift 42 back to vacuum tank 45 and until distributor valve G has been rotated one step to connect the hydraulic valve 38 with the lift of the next holding tank to be emptied. This shunt circuit for the magnetic relay runs from line switch 78 through wire 79, contacts 74—75, wire 80 to wire 90, to coil 87, line 89, branch line 89ᵃ, contacts 91—83 to line 84 and line 85, back to the line switch. This shunt circuit is provided because the snap switch 86 which is actuated by the trip on lift 32 is maintained closed only momentarily, being adapted to be opened, for instance, by spring pressure almost instantly after it has been closed due to the fact that the lift 32 begins to descend and thereby releases the switch almost immediately after the solenoid 43 has been de-energized to permit the return of the fluid pressure medium from lift 32 back to the vacuum tank. Before the next tank is to be emptied the finger which had previously actuated lever 76 of the make and break device C has passed on and said lever is actuated by a spring 98 to disengage contacts 74—75, thus de-energizing the magnetic relay and permitting contact 83 to return into engagement with contact 82 so that when the next finger comes around at the proper time to empty the next succeeding tank that finger will again rock lever 76 and again energize solenoid 43 to open the pilot valve 66 and permit the flow of fluid pressure medium from hydraulic valve 38 to distributor valve 40 which, during the rotation of wheel 77 will have also been rotated one step to distribute the fluid pressure medium through a pipe 41 to the lift 32 of the next tank to be emptied. In this way solenoid F is alternately energized and de-energized each time distributor valve 40 is rotated one step so that the pressure fluid medium is delivered to and returned from the lift 32 of the several holding tanks in succession.

In accordance with usual practice, a strainer 92 is placed in pipe line 37 leading from pressure tank 36; the vacuum tank is provided with the usual filling valve 93 and vacuum gage 94, and the pressure tank is provided with any desired type of safety valve 95, pressure gage 96 and liquid level gage 97.

What I claim is:

1. In a liquid handling apparatus, the combination of a holding tank, means for supplying liquid to said tank, an outlet pipe extending upwardly into said tank to a point above the level to which said tank is adapted to be filled, a sleeve slidable longitudinally on said outlet pipe and having a port near its end remote from the end of said pipe, a vessel surrounding said pipe and sleeve and normally positioned near said ported end of the sleeve and bottom of said holding tank, whereby it will be filled with liquid when liquid is supplied to said tank, said vessel being adapted to communicate with the port in the sleeve, and means for elevating said sleeve and vessel to a point to discharge the contents of the vessel through said port and into the outlet pipe to institute a siphonic action for discharging the contents of the tank through said outlet pipe, said vessel and sleeve being free to return to their original position within the body of liquid to maintain said siphonic action.

2. In a liquid handling apparatus, the combination of a series of holding tanks, means for supplying liquid to the several tanks successively, a discharge device for each tank normally inoperative, a hydraulic lift connected to each discharge device, a pressure tank for supplying power to the lift, a vacuum tank to which the pressure medium may be returned from each lift, a hydraulic valve connected to said pressure tank and said vacuum tank, a discharge valve connected to said hydraulic valve and to each of the several lifts and adapted to successively place the several tanks in communication with the hydraulic valve, means for periodically actuating the hydraulic valve to supply pressure successively to the respective lifts through the distributor valve, and means operable after each lift has been elevated a predetermined distance to render its discharge device operative for reversing the action of the hydraulic valve thereby returning the pressure medium from said lift to said vacuum tank, and a pump adapted to remove said medium from the vacuum tank and restore it to the pressure tank under suitable pressure.

3. In a liquid handling apparatus, the combination of a series of holding tanks, means for supplying liquid to the several tanks successively, a discharge device for each tank normally inoperative, a hydraulic lift connected to each discharge device, a pressure tank for supplying power to the lift, a vacuum tank to which the pressure medium may be returned from each lift, a hydraulic valve connected to said pressure tank and said vacuum tank, a distributing valve connected to said hydraulic valve and to each of several lifts and adapted to successively place the several tanks in communication with the hydraulic valve, a solenoid operatively associated with the hydraulic valve, means for establishing a circuit to the solenoid for actuating said hydraulic valve to supply pressure successively to the respective lifts through the distributor valve, and means operable after each lift has been elevated a predetermined distance to render its discharge device operative for reversing the action of the hydraulic valve thereby returning the pressure medium from said lift to said vacuum tank, and a pump adapted to remove said medium from the vacuum tank and restore it to the pressure tank under suitable pressure.

4. In a liquid handling apparatus, the combination of a series of holding tanks, means for supplying liquid to the several tanks successively, a discharge device for each tank normally inoperative, a hydraulic lift connected to each discharge device, a pressure tank for supplying power to the lift, a vacuum tank to which the pressure medium may be returned from each lift, a hydraulic valve connected to said pressure tank and said vacuum tank, a distributing valve connected to said hydraulic valve and to each of the several lifts and adapted to successively place the several tanks in communication with the hydraulic valve, means for periodically actuating the hydraulic valve to supply pressure successively to the respective lifts through the distributor valve, means operable by each lift for breaking the circuit through the solenoid to reverse the action of said hydraulic valve and permit return of the pressure medium from the lifts to the vacuum tank, thereby permitting the respective lifts to descend, and a pump adapted to remove said medium from the vacuum tank and restore it to the pressure tank under suitable pressure.

5. In an apparatus for handling liquids, the combination of a holding tank and a discharge device for the same, said device comprising a pipe extending up through the tank to a point above the level to which said tank is to be filled and open at its upper end, a sleeve slidable longitudinally on the pipe to and from said open end, a vessel surrounding said sleeve and having a port therein, a shoulder on said sleeve adapted to engage the vessel to elevate the same with said sleeve, said sleeve also having a port therein adapted to establish communication between the port in the vessel and the space between the sleeve and pipe, means for elevating said sleeve and vessel after the tank and vessel have been filled with liquid whereby liquid flowing from the vessel through said ports will be delivered into the opening at the upper end of the pipe, and means for rendering the lifting means inoperative after flow of liquid into said pipe has been established whereby the vessel may recede and produce a continuous film of liquid within the sleeve from the upper end of the discharge pipe to the level of the liquid in the tank.

6. In a liquid handling apparatus, the combination of a holding tank, means for supplying liquid to said tank, an outlet pipe extending upwardly into said tank to a point above the level to which the tank is adapted to be filled, a receptacle slidable longitudinally of the outlet pipe, said receptacle having a port therein to facilitate filling thereof when liquid is delivered to the tank, means for moving said receptacle along said outlet pipe to a position to discharge its contents into said pipe, and means for closing the port in said receptacle when the latter is so moved.

7. In a liquid handling apparatus, the combination of a holding tank, an outlet pipe extending upwardly into said tank to a point above the level to which said tank is adapted to be filled, a receptacle surrounding said pipe, and a sleeve surrounding said pipe and adapted to engage said receptacle for elevating the latter on said outlet pipe, said sleeve having a port therein through which the interior of said receptacle may communicate with said outlet pipe to discharge its contents into said pipe.

8. In a liquid handling apparatus, the combination of a holding tank, an outlet pipe extending upwardly into said tank to a point above the level to which said tank is adapted to be filled, a receptacle surrounding said pipe, and a sleeve surrounding said pipe and adapted to engage said receptacle for elevating the latter on said outlet pipe, said sleeve having a port therein through which the interior of said receptacle may communicate with said outlet pipe to discharge its contents into said pipe, said sleeve being capable of moving downwardly on said pipe independently of the receptacle after the latter has been elevated to a position adjacent the upper end of said pipe.

9. In a liquid handling apparatus, the combination of a holding tank, an outlet pipe extending upwardly in said tank to a point above the level to which said tank is adapted to be filled, a receptacle in said tank adapted to be elevated on said pipe and discharge its contents in said pipe to initiate a siphoning of liquid from said tank through said pipe and means for maintaining said siphoning action independently of said initiating means.

10. In a liquid handling apparatus, the combination of a holding tank, an outlet pipe extending upwardly in said tank to a point above the level to which said tank is adapted to be filled, a receptacle in said tank adapted to be elevated on said pipe and discharge its contents in said pipe to initiate a siphoning of liquid from said tank through said pipe and a sleeve surrounding said pipe capable of maintaining communication between said outlet pipe and the body of liquid in said tank regardless of the level of said body of liquid.

11. In a liquid handling apparatus, the combination of a holding tank, an outlet pipe extending upwardly in said tank, a receptacle slidable on said pipe and having a port therein, a sleeve slidable on said pipe and having a port therein through which said receptacle may communicate with said outlet pipe when said receptacle is moved adjacent the upper end of said outlet pipe, and means carried by said sleeve for closing the port in said receptacle when said receptacle is elevated on the outlet pipe.

NORMAN BENTLEY GARDINER.